United States Patent Office 3,359,487
Patented Dec. 19, 1967

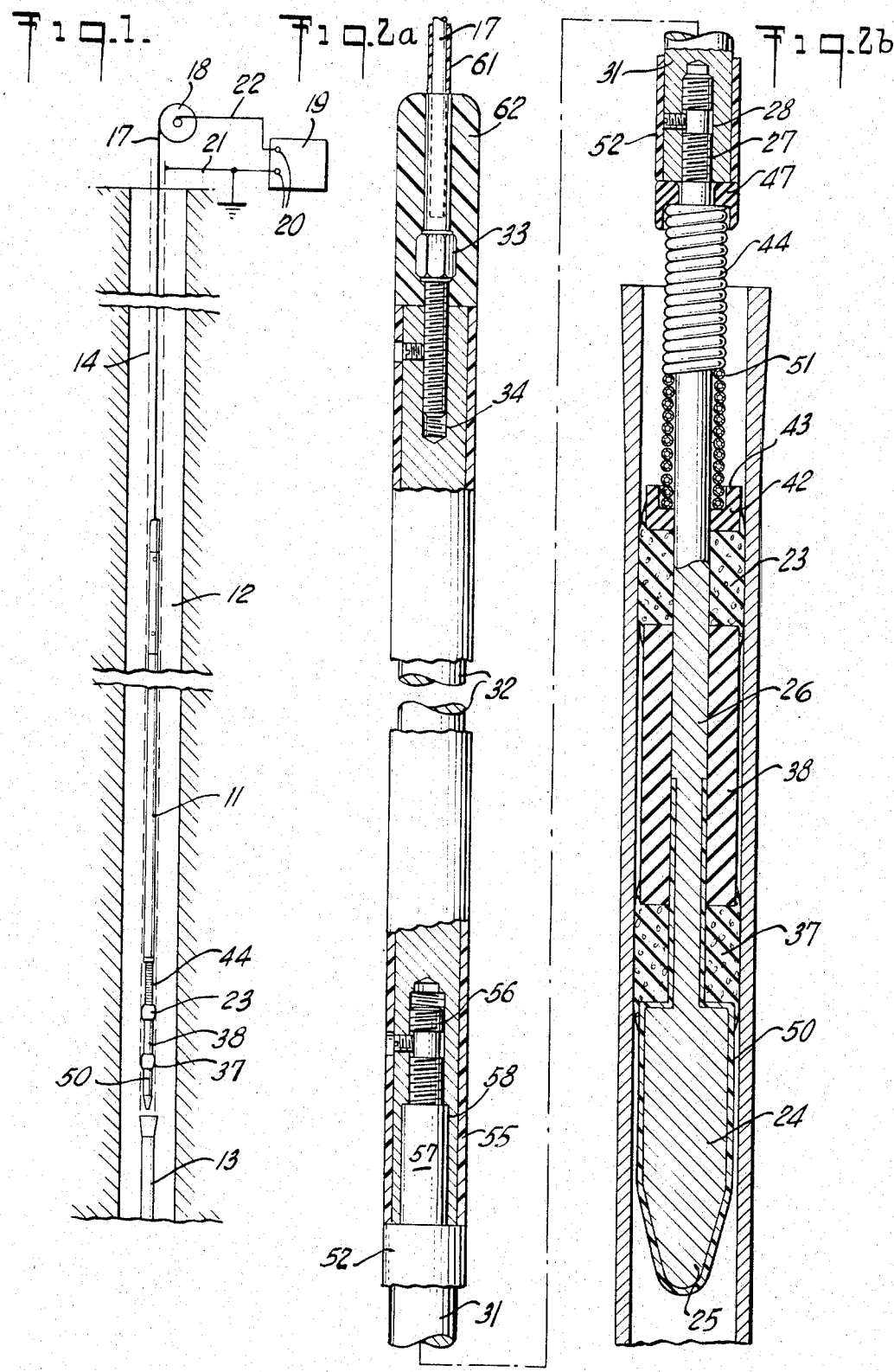

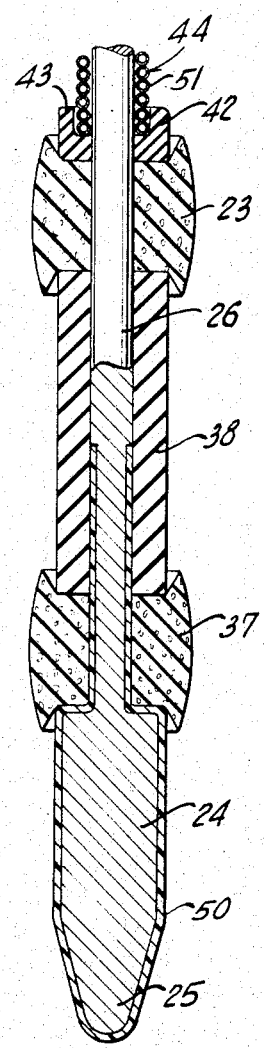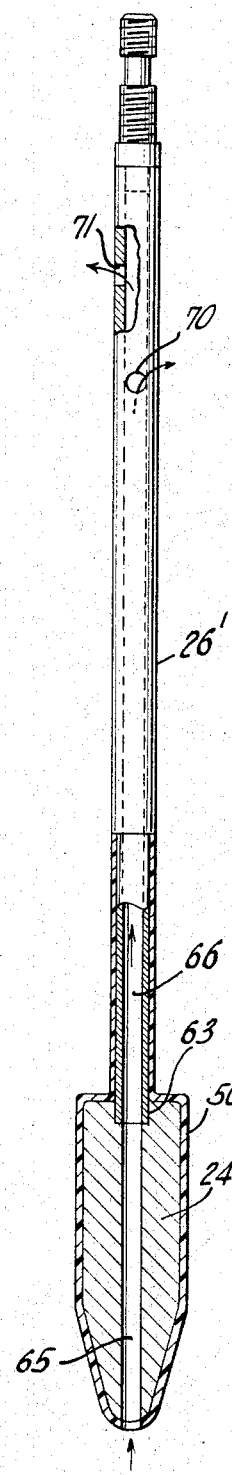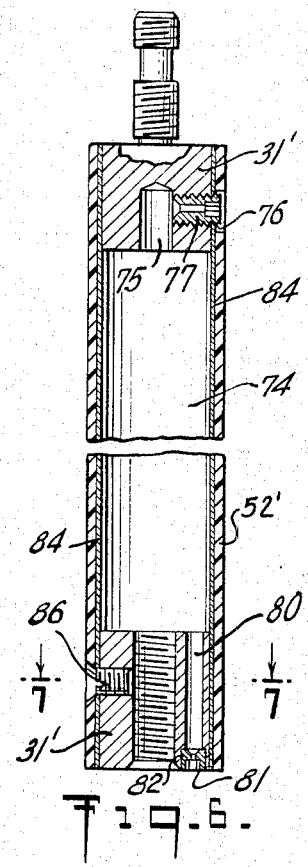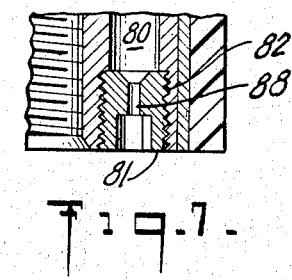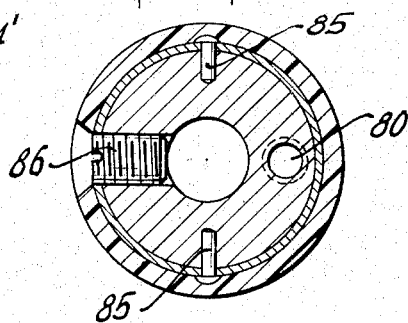

3,359,487
ELECTRICAL CONDUCTIVITY PROBE HAVING A CONDUCTIVE, SPONGY FLUID FILLED WIPER MEMBER FOR CHECKING INTERIOR COATINGS OF PIPE
Charles C. Nathan, Bellaire, and Julius J. Kilnar and Robert W. Pittman, Houston, Tex., assignors to Texaco Inc., New York, N.Y., a corporation of Delaware
Filed Apr. 13, 1964, Ser. No. 359,192
5 Claims. (Cl. 324—54)

ABSTRACT OF THE DISCLOSURE

An electrical probe apparatus for testing interior coatings of pipe. There is a conductive wiper electrode, an insulating prewiping electrode and insulation coating over the probe body and over an electrical conductor cable support.

The foregoing abstract is provided in accordance with the requirements and does not in any manner limit the invention.

This invention concerns testing for breaks or "holidays" in internal type protective coatings in general. More specifically, the invention concerns an improved structure for a probe that is particularly applicable to downhole testing of coatings on the interior surface of well tubing.

Interior coatings on metal pipes and tubing, particularly such tubing employed in oil wells and the like, has been found to be subject to development of breaks or so-called "holidays" in the protective coating material so that corrosion of the metallic pipe or tubing takes place much faster than desired and in spite of the use of such coating. While arrangements have been made for checking such protective coating on tubing in general, it has not been feasible heretofore to make a determination of the condition of such protective coating following insertion of tubing downhole in a deep well, such as an oil well or the like. It has been found that breaks in the interior coating may be created near the joints during makeup and insertion, even though there were none prior to such handling.

Although there have been some prior art suggestions for making tests in accordance with the foregoing indications, i.e., downhole; for one reason or another, such suggestions have not proven satisfactory. Consequently, it is an object of this invention to provide a simple yet meritorious tool that is applicable to such testing, and will provide superior results in an inexpensive manner.

It is another object of this invention to provide improved structure for a probe that is particularly adapted to testing of electrically insulating material type protective coatings on the interior surface of long pipe or tubing, particularly when located downhole within a deep well.

Another object of the invention is the provision of a probe or tool which may be employed downhole in a deep well for checking the electrical conductivity conditions of a coating material on the interior surface of well tubing, wherein such tool employs a wire line support that is electrically conductive with, in addition, a coating thereon of electrically insulating material to avoid any leakage path from the wire line to fluid or directly to the walls of the tubing under test.

Briefly, the invention may be described as relating to a probe for use in measuring electrical properties of interior coating on electrically conductive material pipe located below the surface in a deep well. Such probe comprises an elongated body of electrically conductive material having an electrically conductive wiper thereon for establishing a conductive path to said pipe wherever it exists through said interior coating, and an electrically conductive line connected to said body for completing a circuit from said body to the surface. The probe also comprises first electrically insulating coating means for covering said line to prevent any leakage path for current flow between said line and said pipe, second electrically insulating coating means for covering substantially all of the exposed surface of said body except that covered by said wiper, and electrically insulating wiper means spaced ahead of said conductive wiper for cleaning any conductive film off the surface of said interior coating.

Again briefly, the invention may be described as relating to an improvement that is concerned with a basic combination. The basic combination includes an electrical conductivity probe for use in checking interior protective coating on conductive material pipe. The said probe has an elongated body with an electrically conductive wiper thereon, and an electrically conductive line connected to said body to support the same. The probe also has means for completing an electrical circuit from said wiper to said line within said body. The invention concerns particularly an improvement relating to the foregoing combination which improvement comprises (a) first electrically insulating coating means for covering said line to prevent any leakage path of current flow between said line and said pipe, and (b) second electrically insulating coating means for covering all of the exposed surface of said body except that covered by said wiper.

The foregoing and other objects and benefits of the invention will be more fully set forth below in connection with the best mode contemplated by the inventors of carrying out the invention, and in connection with which there are illustrations provided in the drawings, wherein:

FIGURE 1 is a schematic showing illustrating a probe in accordance with the invention located downhole just above a section of tubing, such as will extend from the surface downward into the hole;

FIGURE 2a is an enlarged longitudinal view largely in cross section, showing the upper end of the probe indicated in FIGURE 1;

FIGURE 2b is an enlarged longitudinal view in cross section, showing the lower end of the probe within a section of tubing;

FIGURE 3 is a fragmentary longitudinal cross section, showing only the lower end of the probe and illustrating the wipers when outside of tubing;

FIGURE 4 is an enlarged longitudinal view mostly in cross section and illustrating the lower or tip portion of a modification of the probe that is illustrated in FIGURES 2 and 3;

FIGURE 5 is an enlarged longitudinal cross section, showing a modified body portion having a reservoir therein;

FIGURE 6 is a greatly enlarged fragmentary cross section, showing the details of the outlet orifice that is employed with the reservoir of FIGURE 5; and FIGURE 7 is an enlarged transverse cross section, taken along the lines 7—7 of FIGURE 5 looking in the direction of the arrows.

Referring to FIGURE 1, there is shown a probe 11 according to the invention. It is illustrated in position downhole in a borehole 12 which has tubing 13 in the hole extending all the way from the surface downhole; but which tubing is only schematically indicated by the dashed lines 14, for the most part.

It will be appreciated that the probe 11 will be supported from the surface within the tubing 13 by means of a wire line 17 that extends from the top of the probe to the surface. The wire line 17 is retained on a drum 18 or the like which is schematically illustrated. It will also be appreciated that in order to carry out the electrical testing to determine whether any so-called holidays or breaks in the electrically insulating material coating exist, there must be some electrical equipment as schematically indicated by a box 19. Electrical connections to the internal circuits (not shown) are made from a pair of terminals 20. It will be appreciated that one of these terminals 20 is connected electrically to the conductive material tubing 13. This may be carried out in any feasible manner, e.g., by a circuit connection 21 which may be grounded as indicated. The other side of the external circuit goes from the other terminal 20 via a circuit connection 22 and the wire line 17, to the probe 11. It will be understood that this arrangement provides for the external circuit that will be completed by the path for flow of current between the probe and the conductive material tubing 13 through breaks or holidays in the insulating material protective coating on the inside of the tubing 13. This current flow will occur wherever such leakage paths may be found through the protective coating. As will appear in more detail below, there is a wiping contact sponge 23 on the probe, for contacting an axially limited area extending around the complete circumference of the inner exposed surface of the coating on the tubing 13.

Referring to FIGURES 2 and 3, some of the details of the construction of a preferred embodiment of probe 11 will be described. Beginning at the lower end of the probe (when viewed as illustrated in FIGURES 1 and 2) there is a spear-like tip 24 that has a rounded point at the end of a tapered nose portion 25. Tip 24 has a short cylindrical body that is integrally attached to a smaller diameter shaft 26. Shaft 26 extends upward and ends with a threaded reduced diameter end portion 27 that is adapted to be screwed into an internally threaded socket 28 which is located at the lower end of a solid conducting material body 31 of the probe 11. The body 31 of probe 11 is preferably about twice as long as the entire spear-tip, i.e., 26 and 24. However, the illustration in FIGURES 2a and 2b is broken off to conserve space. Body 31 lends weight and acts as part of the electrical circuit from the surface to the contactor 23 on the probe 11.

At the upper end of the body 31 there is a like sized connector rod 32 that has a wire line connector lug 33 screwed into an internally threaded or tapped hole 34 located coaxially in the rod 32 at the top thereof. Lug 33 is securely attached, for mechanical strength and for good electrical connection, to the wire line 17 in any feasible manner such as by being swaged onto the end of the wire line.

Down at the spear end of probe 11 there is wiper sponge 37 which surrounds the shaft 26. It is held in place against the shoulders of the tip 24 by an insulating material sleeve like spacer 38. In contact with the other end of spacer 38, there is the contact sponge 23 which also surrounds the shaft 26 of the spear. However, the sponge 23 is saturated with an electrically conductive fluid in order to act as the contactor for the test circuit of the probe 11. It will be noted that sponge 23 is directly in contact with the electrically conductive material body of shaft 26, so that direct low resistance conductive path is made between the conductive material of the shaft 26 and the fluid of the sponge 23.

In order to hold the sponges 23, 37 and the spacer element 38 in proper contact with one another and in place on the probe, there is a spring 44 having a cap 42 on one end thereof. The cap 42 is made of electrically insulating material and has a socket or recess therein formed by a flange portion 43, in order to support one end of the coil spring 44. It will be observed that the spring acts to press the sponges and spacer element down along the shaft 26 toward the shoulder formed by the tip 24. The other end of spring 44 is held in place by a similar spring cap 47. Cap 47 is held in place against the expansion force of spring 44, by the lower end of the body 31 that is attached to the threaded end 27 of the shaft 26 of the spear.

In order to avoid any extraneous electrical leakage paths from the probe 11 to fluid surrounding the probe, or otherwise to the interior surface of tubing 13, there is an insulating material coating 50 which covers the whole tip 24 of the spear and extends upward along the shaft 26 sufficiently to be well within the insulating material spacer 38. Above the conducting sponge 23 there is insulating material coating on the coils of the spring 44. This may be, for example, a plastic tubing 51 which is slid over a piano wire coil to form the coated coil spring 44. It will be observed that the coils of spring 44 are mounted compressed together so that the thickness of tubing 51 presses together between the turns of the coils and forms an insulating material protection around the upper end of the shaft 26.

Above the cap 47 there is an insulation material coating 52 which covers the outer surface of the body 31 of probe 11. This coating 52 extends at least flush with the edge of body 31 and makes firm longitudinal contact at the upper edge thereof with a similar insulation material coating 55 that covers the connector rod 32.

Rod 32 is connected to the upper end of the body 31 by means of a threaded joint 56 at one end of a socket formed by a reduced diameter extension 57 of the body 31, which slideably fits within a recess 58 in the lower end of connector rod 32.

An important feature of the invention is the use of an electrically insulating material coating 61 (FIG. 2a) which covers the wire line 17 throughout the length thereof. Of course, such coating joins in an electrically insulating manner, the connection between the lower end of wire line 17 (via the lug 33) and the upper end of the connector rod 32. The latter is accomplished by providing an insulating material cover 62 which is molded over the lug 33 including the swaged connected end of wire line 17.

It will be observed that the various joints of the probe 11 are maintained firmly in place after joinder thereof, by means of set screws as illustrated.

The conductive wiper or sponge 23 is preferably constructed of homogeneous sponge like material that will absorb and hold the conductive fluid needed to provide an effective contactor. Also, while the inside diameter of the sponge 23 is sized to create a snug fit on the shaft 26, the outside configuration is spherical so that good even contact will be created with the interior surface of the pipe being tested.

The insulating material sponge or wiper 37 may be made of similar configuration and material as the contactor 23. However, this wiper will be mounted without any conductive fluid therein. Furthermore, it is important that the insulating material coating 50 on the tip 24 and shaft 26 of the spear, be made to extend along the shaft 26 at least as far as the width of the wiper 37 and preferably some distance farther, as shown in the illustrations.

Referring now to FIGURES 4 through 7, another modification of the invention will be described. This modification provides for a probe having structure to allow use thereof in tubing when there is a fluid contained in the tubing. Many of the elements are substantially the same as or similar to corresponding elements of the probe described above, in connection with the other figures of the drawings. Consequently, the same reference numbers will be applied to corresponding parts but with prime indicators thereon.

Commencing with the lower end of FIGURE 4, it will be observed that the spear illustrated has a tip 24' and a shaft 26' connected integrally thereto, but in a different manner than was the case in the FIGURES 2 and 3 modification. However, this is an equivalent arrangement since the shaft 26' is firmly attached in some feasible manner such as by welding the exterior of the hollow shaft 26' to the transverse surface of the tip 24' after the shaft 26' has been fitted into a socket 63 bored coaxially into the tip 24'.

There is substantially the same type of coating layer 50' which covers the tip 24' and the lower end of the shaft 26'. The structure which differs in this modification provides for a passage to allow fluid flow that bypasses the two sponges 23 and 37 which will be mounted on the shaft 26' of this modification in the same manner as was the case in the previously described modification. Such passage is made up of a central or axially drilled hole 65 which extends all the way through the tip 24' and connects with a hollow passage 66 within the shaft 26' of the spear. In order to allow exit of the fluid flowing through the passageway (made up of hole 65 and joining passage 66) there are a pair of ports or openings 70 and 71 through the sides of shaft 26' above the location of the upper sponge 23. It will be appreciated that this arrangement provides for fluid passage within the lower portion of the probe so as to bypass both of the sponges. This bypass is necessary, of course, to permit the probe to pass through fluid in the tubing under test. Thus, displaced fluid must be able to flow from in front (below when going down) of the wiper sponge 37 to behind (above when going down) the contact sponge 23. In this manner the bypass fluid is allowed to rejoin the fluid which surrounds the upper portion of the probe within the annulus formed inside of the tubing 13 surrounding the probe 11.

The structure illustrated in FIGURES 5, 6 and 7 applies to a modification of the body 31 which provides for a reservoir that may contain conductive fluid that will act to replenish the fluid saturated conductor sponge 23. Thus, FIGURE 5 shows a body 31' for the probe having a hollow opening or reservoir 74 therein. Of course there will be a corresponding insulation material coating 52' on the exterior of body 31'. The reservoir 74 is connected for filling via a passage 75 extending axially therefrom, and a radial opening or passageway 76 to the exterior of the body 31'. Within the radial passage 76 there is a vented plug 77 which acts to allow pressure equalization above the conductive fluid within reservoir 74 as the level thereof recedes. At the lower end of reservoir 74 there is a passageway 80 which extends parallel to the axis of the body 31' and goes beside the threaded joint which connects body 31' to the upper end of the shaft 26' or 26 as the case may be depending upon which modification of the spear is employed.

At the lower end of passage 80 there is a metering jet which is formed by a plug 81 that is threadably screwed into an internally threaded enlarged end or socket 82 at the extremity of the passageway 80.

It will be observed that the hollow reservoir type body structure 31' illustrated in FIGURE 5 (which is interchangeable with solid body 31) includes an electrically conductive material sleeve 84 which surrounds both end portions of the body 31'. This sleeve 84 is securely attached to the body 31' by means of pins or rivets 85 that are driven radially through the sleeve 84 into the solid portion of the ends of body 31'. This may be done in accordance with the FIGURE 7 illustration. The pins 85 are each located ninety degrees from the passageway 80 and a set screw 86 which is opposite therefrom.

It will be appreciated that the metering jet which is formed by a predetermined diameter passageway 88 (FIG. 6) therethrough, acts to regulate the amount of flow of the conductive material fluid from the reservoir 74 to the space surrounding the shaft 26 or 26' as the case may be, so as to reach the sponge 23.

While particular embodiments of the invention have been described above in accordance with the applicable statutes, this is not to be taken as in any way limiting the invention but merely as being descriptive thereof.

We claim:
1. A probe for use in measuring electrical properties of interior coating on electrically conductive material pipe located below the surface in a deep well, comprising
    an elongated body of electrically conductive material including
        a reduced diameter shaft attached to a spear like end having a pointed tip;
    an electrically conductive wiper located on said reduced diameter shaft portion of said elongated body for establishing a conductive path to said pipe wherever it exists through said interior coating,
        said conductive wiper comprising a homogeneous annular member having a spherical exterior surface for contacting the interior surface of the pipe,
        said annular member comprising a spongy material having an electrically conductive fluid therein,
        said annular member being in firm contact with said reduced diameter shaft;
    an electrically conductive line connected to said body for completing a circuit from said body to the surface,
    first electrically insulating coating means for covering said line to prevent any leakage path for current flow between said line and said pipe,
    second electrically insulating coating means for covering substantially all of the exposed surface of said body except that covered by said conductive wiper,
    electrically insulating wiper means located on said shaft in contact with said spear like end and spaced ahead of said conductive wiper for cleaning any conductive film off the surface of said interior coating,
    said second coatings means covering both said spear like end and said shaft at least as far as the axial width of said insulating wiper,
    an electrically insulating material spacer located axially between and in contact with both said annular member and said insulating wiper, and
    spring means located on said elongated body for applying an axial bias against all three of said annular member, said spacer and said insulating wiper toward said spear like end of said body.

2. The invention according to claim 1 wherein said spring means includes an electrically insulating coating in order to at least partially cover that part of said reduced diameter shaft portion of the elongated body not in contact with said annular member.

3. The invention according to claim 2 further including a fluid reservoir in said elongated body to supply said electrically conductive fluid to said annular member.

4. The invention according to claim 2 further including a fluid bypass through said spear like end to bypass said annular member and said insulating wiper.

5. The invention according to claim 4 further including a fluid reservoir in said elongated body to supply said electrically conductive fluid to said annular member.

References Cited

UNITED STATES PATENTS

| | | | |
|---|---|---|---|
| 2,396,172 | 3/1946 | Groven et al. | 324—54 X |
| 2,779,915 | 1/1957 | Moon | 324—10 |
| 2,833,982 | 5/1958 | Maly | 324—2 |
| 2,978,637 | 4/1961 | Price et al. | 324—54 |
| 3,106,677 | 10/1963 | Edgar | 324—54 |
| 3,210,655 | 10/1965 | McGlasson et al. | 324—54 |

RUDOLPH V. ROLINEC, *Primary Examiner*,

G. R. STRECKER, *Assistant Examiner*.